United States Patent
Yoshida et al.

(10) Patent No.: US 7,785,726 B2
(45) Date of Patent: Aug. 31, 2010

(54) PROCESS FOR PRODUCING HYBRID ION-EXCHANGE MEMBRANES COMPRISING FUNCTIONAL INORGANICS AND GRAFT POLYMER AND ELECTROLYTE MEMBRANES FOR USE IN FUEL CELLS COMPRISING THE HYBRID ION-EXCHANGE MEMBRANES

(75) Inventors: Masaru Yoshida, Takasaki (JP); Tetsuya Yamaki, Takasaki (JP); Masaharu Asano, Takasaki (JP); Yousuke Morita, Takasaki (JP); Soji Nishiyama, Ibaraki (JP); Toshimitsu Tachibana, Ibaraki (JP); Yozo Nagai, Ibaraki (JP)

(73) Assignees: Japan Atomic Energy Agency, Ibaraki (JP); Nitto Denko Corporation, Osaka (JP)

( * ) Notice: Subject to any disclaimer, the term of this patent is extended or adjusted under 35 U.S.C. 154(b) by 1060 days.

(21) Appl. No.: 11/397,808

(22) Filed: Apr. 5, 2006

(65) Prior Publication Data
US 2006/0223895 A1 Oct. 5, 2006

(30) Foreign Application Priority Data
Apr. 5, 2005 (JP) .............................. 2005-108561

(51) Int. Cl.
*H01M 8/10* (2006.01)
(52) U.S. Cl. .............................. 429/30; 429/33; 429/44; 525/276; 526/242; 526/247
(58) Field of Classification Search .................. 429/30, 429/33, 44; 525/276, 242, 247
See application file for complete search history.

(56) References Cited

U.S. PATENT DOCUMENTS

| | | | | |
|---|---|---|---|---|
| 4,262,041 A * | 4/1981 | Eguchi et al. | ................ | 427/245 |
| 5,840,192 A * | 11/1998 | El Moussaoui et al. | ..... | 210/638 |
| 6,607,856 B2 * | 8/2003 | Suzuki et al. | ................. | 429/30 |
| 6,689,501 B2 * | 2/2004 | Stone et al. | ................... | 429/30 |
| 7,220,508 B2 * | 5/2007 | Watakabe et al. | ............. | 429/33 |
| 2003/0175569 A1 * | 9/2003 | Inagaki et al. | ................. | 429/30 |
| 2006/0166067 A1 | 7/2006 | Kiefer et al. | | |
| 2007/0292734 A1 | 12/2007 | Kiefer et al. | | |

FOREIGN PATENT DOCUMENTS

| | | |
|---|---|---|
| JP | 06-111827 | 4/1994 |
| JP | 06-111834 | 4/1994 |
| JP | 09-251857 | 9/1997 |
| JP | 11-273696 | 10/1999 |
| JP | 2000-516014 | 11/2000 |
| JP | 2002-528867 | 9/2002 |
| JP | 2002-352818 | 12/2002 |
| JP | 2003-082129 | 3/2003 |
| JP | 2003-261697 | 9/2003 |
| JP | 2003-308855 | 10/2003 |
| JP | 2004-014436 | 1/2004 |
| JP | 2004-051685 | 2/2004 |
| JP | 2004-059752 | 2/2004 |
| JP | 2004-158270 | 6/2004 |
| JP | 2004-172124 | 6/2004 |
| JP | 2004-300360 | 10/2004 |
| JP | 2005-056787 | 3/2005 |
| JP | 2005-063778 | 3/2005 |
| WO | 96/29752 | 9/1996 |
| WO | WO-00/24074 | 4/2000 |
| WO | 03/096465 A1 | 11/2003 |

OTHER PUBLICATIONS

Japanese Office Action issued Mar. 18, 2010 in corresponding Japanese Patent Application 2005-108561.

* cited by examiner

*Primary Examiner*—Peter D. Mulcahy
*Assistant Examiner*—Henry Hu

(57) ABSTRACT

Polymer ion-exchange membranes having outstanding electrical conductivity, water retention and oxidation resistance are produced by the steps of uniformly mixing an organic high-molecular weight resin with functional inorganics having the abilities to promote graft polymerization of polymerizable monomers, adsorb water and conduct protons, irradiating the resulting functional inorganics/polymer membrane to initiate graft polymerization or graft copolymerization of polymerizable monomers having functional groups, and then introducing sulfonic acid groups into the graft chains.

13 Claims, No Drawings

PROCESS FOR PRODUCING HYBRID ION-EXCHANGE MEMBRANES COMPRISING FUNCTIONAL INORGANICS AND GRAFT POLYMER AND ELECTROLYTE MEMBRANES FOR USE IN FUEL CELLS COMPRISING THE HYBRID ION-EXCHANGE MEMBRANES

BACKGROUND OF THE INVENTION

This invention relates to a process for producing polymer ion-exchange membranes as solid polymer electrolyte membranes suitable for use in fuel cells.

The invention also relates to a process for producing polymer ion-exchange membranes having outstanding electrical conductivity and oxidation resistance that are solid polymer electrolyte membranes suitable for use in fuel cells.

Fuel cells using solid polymer electrolyte ion-exchange membranes feature high energy density, so they hold promise for use as power supplies to automobiles or as convenient auxiliary power supplies. One of the most critical aspects of the fuel cell technology is the development of polymer ion-exchange membranes having outstanding characteristics.

In a solid polymer ion-exchange membrane fuel cell, the ion-exchange membrane serves to conduct protons and it also plays the part of diaphragm which prevents direct mixing of the fuel hydrogen or methanol with the oxidant air (oxygen). The ion-exchange membrane has several requirements of an electrolyte to meet: large ion-exchange capacity; sufficient chemical stability of the membrane to allow for prolonged application of an electric current, in particular, high resistance (oxidation resistance) to hydroxide radicals and the like which are principal factors that contribute to deterioration of the membrane; heat resistance at 80° C. and above which is the cell operating temperature range; and constant and high water retention of the membrane which enables it to keep low electrical resistance. In addition, the membrane which also plays the part of diaphragm is required to have outstanding mechanical strength and dimensional stability, as well as having no excessive permeability to the fuel hydrogen gas or methanol or oxygen gas.

When a reformed gas is to be used as fuel gas in fuel cells, it is desired that the fuel cell membrane be operated at 120° C. and higher temperatures in order to prevent poisoning of the platinum catalyst by carbon monoxide and other gases that are contained in very small amounts in the reformed gas. Currently used fluoropolymer-based fuel cell membranes have the disadvantage that the membrane dries up during cell operation, whereupon its water content decreases. If the membrane dries up, its internal resistance increases to lower its electrical conductivity, so the water content in the membrane must be controlled by various methods such as humidifying the fuel gas or operating the fuel cell at low enough temperatures of 60-80° C. [see J. J. Summer et al., *J. Electrochem. Soc.*, 145, p. 107 (1998)]. It has therefore been pointed out that the conventional fluoropolymer-based fuel cell membrane requires a complicated fuel cell system. On the other hand, a membrane whose water content will not decrease if it is operated at 120° C. and higher is said to have remarkable advantages including less catalyst poisoning, elimination of the system for humidifying the fuel gas, an increased rate of electrode reactions, and a reduced size of the heat exchange system.

Early models of the polymer ion-exchange membrane fuel cell used a hydrocarbon-based polymer ion-exchange membrane produced by copolymerization of styrene and divinylbenzene. However, this ion-exchange membrane, being very poor in durability due to low oxidation resistance, was not highly feasible and was later replaced extensively by perfluorosulfonic acid-based membranes such as DuPont's Nafion®.

The conventional fluorine-containing polymer ion-exchange membranes such as Nafion® have outstanding chemical durability and stability but, on the other hand, it has been pointed out that their ion-exchange capacity is as small as about 1 meq/g and, due to insufficient water retention (low percent water content) at elevated temperature, the ion-exchange membrane will dry up, thereby impedes proton conduction or, in the case of using methanol for fuel, causes swelling of the membrane or cross-over of the methanol. If, in order to increase the ion-exchange capacity, one attempts to introduce more sulfonic acid groups, the membrane, due for example to its own characteristics and the absence of a cross-linked structure in polymer chains, will swell and its strength drops markedly. In addition, methanol used for fuel will cause swelling of the membrane.

Therefore, with the conventional fluorine-containing polymer ion-exchange membranes, the quantity of sulfonic acid groups had to be adjusted to small enough levels to guarantee the required membrane strength, so that one could only produce membranes having ion-exchange capacities of no more than about 1 meq/g. As another problem, fluoropolymers have only low affinity between the fluorine and water molecules and the chance of drying up increases with the cell operating temperature; this has made it extremely important to control the water content in the membrane by various methods such as humidifying the fuel gas or adjusting the operating temperature to between 60 and 80° C.

In addition, the fluorine-containing polymer ion-exchange membranes such as Nafion® have the problem of difficult and complex monomer synthesis; what is more, the process of polymerizing the synthesized monomers to produce the intended polymer membrane is also complex and yields a very expensive product, thereby presents a large obstacle to realizing a commercial proton-exchange membrane fuel cell that can be installed on automobiles and other equipment. Hence, efforts have been made to develop low-cost, yet high-performance electrolyte membranes that can be substituted for Nafion® and other conventional fluorine-containing polymer ion-exchange membranes.

In the field of radiation-induced graft polymerization which is closely related to the present invention, attempts are being made to prepare solid polymer electrolyte membranes by grafting onto polymer membranes those monomers into which sulfonic acid groups can be introduced. The present inventors conducted intensive studies with a view to developing such new solid polymer electrolyte membranes and found that solid polymer electrolyte membranes characterized by a wide range of controllability of ion-exchange capacity could be produced by first introducing a styrene monomer into a poly(tetrafluoroethylene) film having a cross-linked structure by radiation-induced graft polymerization reaction and then introducing sulfonic acid groups into the graft chains. The present inventors filed a patent application for the solid polymer electrolyte membrane having such characteristics and a process for producing it (JP 2001-348439 A). However, this ion-exchange membrane was composed of styrene units, so when it was supplied with an electric current for a prolonged period of time at 80° C. which was rather high temperature for the operation of fuel cells, the graft chain portion was partly oxidized to cause gradual decrease in the ion-exchange capacity of the membrane.

Membranes based on fluoropolymers other than crosslinked poly(tetrafluoroethylene) have been proposed, and an example is an ion-exchange membrane produced by first introducing a styrene monomer into an ethylene-tetrafluoroethylene copolymer through a radiation-induced graft polymerization reaction and then introducing sulfonic acid groups; the thus prepared membrane functions as an ion-exchange membrane for use in fuel cells (see JP 9-102322 A). However, this graft ethylene-tetrafluoroethylene copolymer membrane has the same drawback as described above and if a large electric current is applied to it for a prolonged period, the polystyrene graft chain portion undergoes oxidative deterioration and the ion-exchange capacity of the membrane will decrease gradually.

The present invention was accomplished in order to solve the aforementioned problems of the prior art. Fluoropolymer-based ion-exchange membranes which are currently in the mainstream have the disadvantage of being low in electrical conductivity and having low percent water content; the conventional graft polymerized polymer ion-exchange membranes have the disadvantage of low oxidation resistance.

SUMMARY OF THE INVENTION

The present invention provides a process for producing a polymer ion-exchange membrane by the steps of uniformly mixing an organic high-molecular weight resin with functional inorganics having the abilities to promote graft polymerization of polymerizable monomers, adsorb water and conduct protons, irradiating the resulting functional inorganics/polymer membrane to initiate graft polymerization or graft copolymerization of polymerizable monomers having functional groups, and then introducing sulfonic acid groups into the graft chains.

The present inventors undertook intensive studies on the synergism between the functional inorganics and the sulfonic acid groups in the graft chains. As a result, they invented a polymer ion-exchange membrane featuring not only higher degrees of grafting onto the substrate polymer but also improved electrical conductivity and water retention of the membrane.

The present invention provides a polymer ion-exchange membrane of which the electrical conductivity and water retention can be controlled at high levels over a wide range and which has high oxidation resistance; in particular, the present invention provides an ion-exchange membrane suitable for use in fuel cells.

The polymer ion-exchange membrane produced by the present invention shows outstanding characteristics in that it has high electrical conductivity, water retention and oxidation resistance.

The ion-exchange membrane of the present invention is particularly suitable for use in fuel cells. It is also useful as an inexpensive, yet durable electrolyte membrane or ion-exchange membrane.

DETAILED DESCRIPTION OF THE INVENTION

In one embodiment of the invention, an ethylene-tetrafluoroethylene copolymer (hereinafter abbreviated as ETFE) which is a thermoplastic polymer is used as the organic high-molecular weight resin.

(On The Functional Inorganics)

At least one inorganic fine powder is selected from among the following three groups: the group of inorganics that can easily provide points for initiation of graft polymerization upon irradiation and which are highly capable of retaining the water of crystallization and adsorption water and which consist of fine particulate amorphous silica ($SiO_2$), $H^+$ form mordenite (($Ca,Na_2,K_2$)$Al_2Si_{10}O_{24}\cdot 7H_2O$), alumina ($Al_2O_3$), and zirconium oxide ($ZrO_2$); the group of inorganic proton conductors which consists of zirconium phosphate ($Zr(HPO_4)_2\cdot nH_2O$), phosphotungstic acid hydrate ($H_3PW_{12}O_{40}\cdot nH_2O$), silicotungstic acid hydrate ($H_4SiW_{12}O_{40}\cdot nH_2O$), and molybdophosphoric acid hydrate ($MoO_3H_3PO_4\cdot nH_2O$); and the group of complexes of the first and second groups which consist of amorphous silica having phosphotungstic acid hydrate, zirconium phosphate or silicotungstic acid hydrate adsorbed thereon, as well as mordenite and alumina having phosphotungstic acid hydrate, zirconium phosphate or silicotungstic acid hydrate adsorbed thereon. The selected inorganic fine powder is added to the ETFE resin in an amount ranging from 1 wt % to 20 wt % and the ingredients are mixed uniformly; thereafter, the mixture is shaped to form a functional inorganics/polymer membrane.

The fine particulate amorphous silica (Aerosil a) is available in different types depending on the specific surface area, tendency to agglomerate, and hydrophobicity. Finer particles are preferred. The other inorganics are preferably prepared by the following method: they are first put in aqueous solution or the like; then, a poor solvent is added to precipitate fine particles, which are filtered and dried under reduced pressure. The fine powder of amorphous silica having phosphotungstic acid hydrate adsorbed thereon may be prepared by the following method: to an aqueous solution of phosphotungstic acid hydrate, tetraethyl orthosilicate ($Si(OC_2H_5)_4$) and propanol are added in small amounts and following the addition of an amorphous silica powder, the mixture is stirred at room temperature; the mixture is then left to stand for a while, filtered and dried under reduced pressure. To mix the high-molecular weight resin with the inorganic fine powders, it is preferred that a specified amount of the inorganic fine powder is gradually added to the ETFE resin as it is kneaded by means of a resin mixer with agitating blades or a mixing roll at a temperature 10° C.-80° C. above its melting point (270° C.). When the resin has been fully mixed with the inorganic fine powder to homogeneity, the mixture is recovered and shaped to a thickness of about 50 µm with a press to form a functional inorganics/ETFE membrane.

(On the Thermoplastic Polymer)

The thermoplastic polymer to be applicable in the present invention is not limited to the ethylene-tetrafluoroethylene copolymer (ETFE) used in one embodiment of the invention; other fluoropolymers including a tetrafluoroethylene-hexafluoropropylene copolymer, a tetrafluoroethylene-perfluoroalkylvinyl ether copolymer and poly(vinylidene fluoride) can also be treated in the same way as described above to prepare the functional inorganics/polymer membrane.

Still other thermoplastic polymers that can be used in the present invention are hydrocarbon-based polymers (i.e., high-molecular weight polyethylene, polypropylene and polyamide) and hydrocarbon-based polymers having aromatic rings (i.e., polyethylene terephthalate, polyamide, polyimide, polyether imide, polyamideimide, and polybenzimidazole). These high-molecular weight resins may be mixed with the inorganic fine powders in the same way as described above for ETFE to prepare the functional inorganics/polymer membrane.

Take, for example, the polyether imide resin; it is preferably mixed with the inorganic fine powder as they are kneaded by means of a resin mixer with agitating blades or a mixing roll at a temperature not lower than the melting point of the resin [e.g. about 380° C. in the case of the polyether imide resin Ultem a (General Electric)]. In an alternative method of mixing the hydrocarbon-based high-molecular weight resins with the inorganic fine powders, the high-molecular weight resins are swelled in an organic solvent at room temperature and the inorganic fine powder is gradually added as the two ingredients are kneaded at room temperature; thereafter, the mixing is continued at an elevated temperature so that the inorganic fine powder is uniformly mixed in the high-molecular weight resin. In the case of polyether imide, suitable organic solvents are polar solvents such as methylene chloride and trichloroethylene.

The thus prepared functional inorganics/polymer membrane is exposed to an ionizing radiation so that one or more polymerizable monomers indicated below are subjected to graft polymerization to prepare a functional inorganics/graft polymer membrane.

(On Polymerizable Monomers or Copolymerizable Monomers)

In the present invention, polymerizable monomers to be grafted to the functional inorganics/polymer membrane may be the polymerizable monomers set forth below under (1)-(4) or the polymerizable monomer/copolymerizable monomer system (5). In the present invention, the polymerizable monomer shall mean a monomer unit into which sulfonic acid groups can be introduced after graft polymerization, and the copolymerizable monomer shall mean a monomer unit into which sulfonic acid groups cannot easily be introduced after graft copolymerization.

(1) one or more polymerizable monomers selected from the group consisting of styrene, styrene derived monomers (i.e., α-methylstyrene, 2,4-dimethylstyrene, vinyltoluene, and 4-tert-butylstyrene), polymerizable monomers having aromatic rings [i.e., acenaphthylene, indene, benzofuran, 5-vinyl-2-norbornane, and vinyl ketone $CH_2=CH(CO(—C_6H_5))$], and vinyl ether fluorides [i.e., $CF_2=CF(O(—C_6H_5))$ and $CH_2=CF(O(—C_6H_5))$];

(2) one or more polymerizable monomers selected from the group consisting of monomers having a sulfonyl halide group, i.e., $CF_2=CF(SO_2X^1)$ (where $X^1$ is the halogen group —F or —Cl, as hereinafter) and $CH_2=CF(SO_2X^1)$;

(3) one or more polymerizable monomers selected from the group consisting of monomers having a sulfonyl halide group, i.e., $CF_2=CF(O(CF_2)_{1-2}SO_2X^1)$ and $CF_2=CF(OCH_2(CF_2)_{1-2}SO_2X^1)$;

(4) one or more polymerizable monomers selected from the group consisting of monomers having an active halogen group, i.e., $CF_2=CF(O(CF_2)_{1-2}X^2)$ (where $X^2$ is the halogen group —Br or —Cl, as hereinafter), $CF_2=CF(OCH_2(CF_2)_{1-2}X^2)$ and $CF_2=CFBr$; and (5) a polymerizable monomer/copolymerizable monomer system comprising one or more of the polymerizable monomers (2)-(4) and at least one copolymerizable monomer selected from the group consisting of acrylic monomers [i.e., $CF_2=CR^1(COOR^2)$ (where $R^1$ is —$CH_3$ or —F, and $R^2$ is —H, —$CH_3$, —$C_2H_5$ or —$C(CH_3)_3$, as hereinafter) and $CH_2=CR^1(COOR^2)$], and ethylenic monomers [i.e., $CH_2=CF_2$ and $CH_2=C(CH_3)_2$], said copolymerizable monomer being added in an amount not exceeding 100 mol % of the polymerizable monomer.

The acrylic copolymerizable monomer as referred to in (5) may be exemplified by $CF_2=CF(COOCH_3)$, $CF_2=C(CH_3)(COOCH_3)$, $CH_2=C(CH_3)(COOH)$, $CH_2=CF(COOCH_3)$, $CH_2=CF(COOC(CH_3)_3)$, etc. These copolymerizable monomers are such that after graft copolymerization, sulfonic acid groups cannot easily be introduced into the grafted monomer units; hence, they are preferably grafted in amounts not exceeding 100 mol % of the polymerizable monomer.

Compared to the case of performing homo-graft polymerization using the polymerizable monomers (2)-(4), graft copolymerization using the copolymerizable monomer as in the system (5) features a higher rate of graft polymerization and, hence, graft copolymerization is effective for the purpose of enhancing the degree of grafting.

The polymerizable monomers (1)-(4) and the polymerizable monomer/copolymerizable monomer system (5) may be used as dilutions with various solvents such as benzene, toluene, cyclohexane, cyclohexanone, dimethyl sulfoxide, n-hexane, t-butanol, Freon 112 ($CCl_2FCCl_2F$), Freon 113 ($CCl_2FCClF_2$), dichloroethane, and chloromethane.

The above-described polymerizable monomers and polymerizable monomer/copolymerizable monomer system may be used in combination with one or more crosslinking agents selected from the group consisting of divinylbenzene, triallyl cyanurate, triallyl isocyanurate, 3,5-bis(trifluorovinyl)phenol, and 3,5-bis(trifluorovinyloxy)phenol, as well as $(CH_2=CH(C_6H_4))(CH_2)_{1-4}(CH_2=CH(C_6H_4))$ and $(CH_2=CH(C_6H_4))(C(C_6H_4)_2)(CH_2=CH(C_6H_4))$ having a bis(vinylphenyl) group; such crosslinking agents may be added in amounts not exceeding 30 mol % of the total monomers (the sum of the polymerizable monomers and the copolymerizable monomers). Graft polymerization may be performed using such total monomers/crosslinking agent system.

The high-molecular weight resins that are preferably used with the polymerizable monomer (1) are: fluoropolymers, i.e., ethylene-tetrafluoroethylene copolymer (ETFE), tetrafluoroethylene-hexafluoropropylene copolymer, tetrafluoroethylene-perfluoroalkylvinyl ether copolymers, and poly (vinylidene fluoride); hydrocarbon-based polymers, i.e., high-molecular weight polyethylene, polypropylene, and polyamide; and hydrocarbon-based polymers having aromatic rings, i.e., polyethylene terephthalate, polyamide, polyimide, polyether imide, polyamideimide, and polybenzimidazole.

The high-molecular weight resins that are preferably used with the polymerizable monomers (2)-(4) are: hydrocarbon-based polymers, i.e., high-molecular weight polyethylene, polypropylene, and polyamide; and hydrocarbon-based polymers having aromatic rings, i.e., polyethylene terephthalate, polyamide, polyimide, polyether imide, polyamideimide, and polybenzimidazole.

(On Graft Polymerization)

To graft the above-mentioned monomers to the functional inorganics/polymer membrane, the latter is first put into a stainless or glass pressure-resistant vessel, which is sufficiently drawn to a vacuum and filled with an inert gas (Ar) to an atmospheric pressure. The functional inorganics/polymer membrane is then exposed to an ionizing radiation to generate active points for grafting the monomers to it.

The ionizing radiation to be used is preferably $^{60}$Co-γ rays or X-rays having high penetrating power or electron beams having sufficiently high energy to penetrate the irradiation vessel, the polymer membrane or the polymerizable monomer solution. Ionizing radiations such as $^{60}$Co-γ rays are usually applied in absorbed doses between 10 kGy and 1 MGy; in the case of polymers such as fluorine-containing resins, high-molecular weight polyethylene and polypropylene that can easily generate active species for graft polymerization and which tend to deteriorate upon irradiation, the dose is preferably between 10 kGy and 500 kGy, and in the case of polymers having aromatic rings which are less sensitive to radiation, the preferred dose is between 100 kGy and 1 MGy.

In a subsequent step, the pressure-resistant vessel containing the irradiated functional inorganics/polymer membrane is charged with a mixed solution of the polymerizable monomer, the polymerizable monomer/copolymerizable monomer system or the polymerizable monomer/copolymerizable monomer/crosslinker system after they have been deprived of oxygen by bubbling with an inert gas or by freeze-degassing; the quantity of the mixed solution should be sufficient to ensure that the membrane is fully immersed in it; graft polymerization or graft copolymerization is then performed. The polymerizable monomers which are gaseous at ordinary temperatures are added after they are liquefied under pressure. The presence of oxygen retards the graft polymerization reaction, so the sequence of operations described above must be performed in an inert gas such as argon gas or nitrogen gas.

Graft polymerization can be performed by either "post-graft polymerization" in which the functional inorganics/polymer membrane is first exposed to an ionizing radiation before it is brought into contact with the polymerizable monomers to effect graft polymerization reaction or by "simultaneous irradiation" in which the functional inorganics/polymer membrane and the polymerizable monomers or the like are simultaneously exposed to an ionizing radiation to effect graft polymerization reaction. In the case of post-graft polymerization, the temperature for graft polymerization should not be higher than the boiling points of the polymerizable monomers or the solvent and is typically between 0° C. and 100° C.; if simultaneous irradiation is adopted, graft polymerization is preferably effected at room temperature. In post-graft polymerization (see formula (1) in the Examples), the degree of grafting is higher at increasing dose, or at higher grafting temperature, or as the grafting time is extended. In simultaneous irradiation, the degree of grafting is higher at increasing dose of radiation, or as the lower dose rate of radiation is applied for a longer period. By these methods, one can obtain the functional inorganics/graft polymer membrane.

(On the Introduction of Sulfonic Acid Groups)

After preparing the functional inorganics/graft polymer membrane in the manner described above, sulfonic acid groups are introduced into the membrane to make a hybrid ion-exchange membrane comprising the functional inorganics and the graft polymer.

In order to introduce sulfonic acid groups into the functional inorganics/graft polymer membrane that uses the polymerizable monomer (1), the phenyl groups in the grafted molecular chains may be reacted with a solution of chlorosulfonic acid in dichloroethane or chloroform at a 0.5 molarity, whereupon the sulfonic acid groups can be introduced into the graft chains. In the case of phenyl groups, sulfonic acid groups are introduced into the graft chains by dehydrochlorination reaction directed at a specified substitution position on the phenyl group.

Similarly, in the case of the functional inorganics/graft polymer membrane that uses the polymerizable monomer (2) or (3), [—$SO_2X^1$] groups in the grafted molecular chains are converted to sulfonate [—$SO_3M$] groups (where M is the alkali metal Na or K) by reaction in a 0.1N-10N solution of potassium hydroxide (KOH) or sodium hydroxide (NaOH) in water, a water/alcohol solution, or a water/dimethyl sulfoxide solution at a temperature between room temperature and 100° C.; thereafter, the sulfonate groups are converted to sulfonic acid groups [—$SO_3H$] in a 1N-2N sulfuric acid solution at 60° C.

Further, in the case of the functional inorganics/graft polymer membrane that uses the polymerizable monomer (4), the active halogen groups [—$X^2$, Br] in the grafted molecular chains are subjected to reaction in a solution of sulfite or hydrogensulfite in water, a water/alcohol solution or the like so that they are converted to sulfonate groups [—$SO_3M$] (where M is the alkali metal Na or K) and subsequently the sulfonate groups are converted to sulfonic acid groups [—$SO_3H$] by the same method as described above.

Ester groups ($COOR^2$) in the co-grafted chains obtained with the functional inorganics/polymer membrane that uses the polymerizable monomer/copolymerizable monomer system (5) can also be converted to carboxyl groups by reaction with a solution of sodium hydroxide (NaOH) or potassium hydroxide (KOH). When the ion-exchange membrane obtained by the present invention is used as a fuel cell membrane, the carboxyl groups which are extremely useful for retaining the water in the membrane contribute effectively to improving its electrical conductivity.

(On the Introduction of a Crosslinked Structure)

The functional inorganics/polymer membrane may be a membrane having no crosslinked structure; however, introducing a crosslinked structure into the membrane offers several advantages, including an improvement in the heat resistance of the hybrid ion-exchange membrane prepared by the present invention which comprises the functional inorganics and the graft polymer, a smaller degree of membrane swelling, in particular, suppressed cross-over of methanol used for fuel. If hydrocarbon-based resins having aromatic rings are treated with chlorosulfonic acid to introduce sulfone groups, the resins themselves are partly sulfonated, causing the membrane to swell. In this case, too, membranes having a crosslinked structure are effective. To introduce a crosslinked structure into the ion-exchange membrane according to the present invention, the functional inorganics/polymer membrane as prepared by mixing the inorganic fine powder into the high-molecular weight resin may be exposed to an ionizing radiation for a total dose of 10 kGy-10 MGy, whereby the membrane is crosslinked; the crosslinked membrane is then subjected to graft polymerization reaction. According to another way of introducing a crosslinked structure, the functional inorganics/graft polymer membrane as prepared by graft polymerization may be exposed to an ionizing radiation for a total dose of 10 kGy-10 MGy.

(On Water Retention)

In the hybrid ion-exchange membrane of the present invention which comprises the functional inorganics and the graft polymer, its electrical conductivity and water retention (percent water content) can be enhanced by selecting a suitable thermoplastic high-molecular weight resin or by adjusting the amount of the functional inorganic powder to be added and the amount of sulfonic acid groups to be introduced. In ion-exchange membranes for fuel cells that use organic polymer membranes, an unduly low percent water content is not preferred since the slightest change in the operating conditions will cause variations in the membrane's electrical conductivity and gas permeation coefficient. The conventional Nafion membrane has almost all molecular chains composed of —($CF_2$)— units, so if the cell is operated at temperatures higher than 80° C., the water molecules in the membrane will become insufficient and the membrane's electrical conductivity will drop rapidly. By contrast, the hybrid ion-exchange membrane of the present invention has in it fine particulate amorphous silica ($SiO_2$), $H^+$ form mordenite (($Ca,Na_2,K_2$) $Al_2Si_{10}O_{24} \cdot 7H_2O$), alumina ($Al_2O_3$), and zirconium oxide ($ZrO_2$) which are inorganics highly capable of adsorbing water molecules and this contributes to retaining the proton conductivity of the membrane by maintaining the water in the membrane. Similar effects are obtained by a membrane having mixed therein zirconium phosphate ($Zr(HPO_4)_2 \cdot nH_2O$), phosphotungstic acid hydrate ($H_3PW_{12}O_{40} \cdot nH_2O$), silicotungstic acid hydrate ($H_4SiW_{12}O_{40} \cdot nH_2O$), and molybdophosphoric acid hydrate ($MoO_3H_3PO_4 \cdot nH_2O$) which are inorganic proton conductors containing much water of crystallization. In addition, complexes of the above-mentioned inorganics, i.e., amorphous silica having phosphotungstic acid hydrate, zirconium phosphate or silicotungstic acid hydrate adsorbed thereon, as well as mordenite and alumina having phosphotungstic acid hydrate, zirconium phosphate or silicotungstic acid hydrate adsorbed thereon, are also effective in retaining water molecules and conducting protons. The synergism of such functional inorganics and the sulfonic acid groups in the graft chains contributes to maintaining the percent water content of the membrane at high enough level; if the inorganics in the ion-exchange membrane retain water in the form of adsorption water or as the water of crystallization, effective permeation of protons occurs but the permeation of the fuel methanol is suppressed.

(On the Membrane Strength)

However, if an unduly large amount of the functional inorganic fine powder is added to the high-molecular weight resin, the strength of the resulting hybrid ion-exchange resin comprising the functional inorganics and the graft polymer is decreased. Therefore, the functional inorganic fine powder is preferably added to the high-molecular weight resin in an amount ranging from 1 wt % to 20 wt %. Aside from the functional inorganics, the ion-exchange membrane contains hydrophilic groups such as sulfonic acid groups and carboxyl groups in the graft chains and, hence, the percent water content of the membrane can be controlled within the range of 10-100 wt %. The percent water content of the ion-exchange membrane of the present invention is generally between 10 and 100 wt %, preferably between 20 and 80 wt %.

(On the Degree of Grafting)

The hybrid ion-exchange membrane of the present invention which comprises the functional inorganics and the graft polymer is such that by adjusting the amount of the graft chains to be introduced, namely, the amount of the sulfonic acid groups to be introduced, the electrical conductivity and the ion-exchange capacity of the resulting membrane can be altered. In order to introduce more sulfonic acid groups, the degree of their grafting to the membrane needs to be enhanced and in terms of the radiation-induced graft reaction, the functional inorganics are also effective in increasing the degree of grafting of polymerizable monomers. To be more specific, the functional inorganics, in the interaction between radiation and matter, emit more secondary electrons than organic matter having a lower density, enabling an increased number of active points to be generated for graft polymerization. In particular, a silica powder generates radicals or cationic active species upon irradiation to realize a very efficient progress of the radiation-induced graft reaction; hence, high degree of grafting can be achieved by exposure to a small enough dose of radiation. The functional inorganics are also effective in enhancing the degree of grafting fluorine-containing monomers which are comparatively low in polymerizability.

The graft polymerization reaction shows a tendency to saturate gradually when the degree of grafting reaches 40-80%. In the present invention, the degree of grafting is preferably 10-100%, more preferably 10-80%, with respect to the membrane's weight (the sum of the polymer and the inorganic powder).

(On Ion-Exchange Capacity)

The term "ion-exchange capacity" of the ion-exchange membrane as used herein is calculated for the molar amount of ion exchange groups per the membrane's weight (the sum of the polymer and the inorganic powder) and is expressed in meq/g. Depending on the type of the polymerizable monomer used, the hybrid ion-exchange membrane comprising the functional inorganics and the graft polymer has an ion-exchange capacity smaller than 0.3 meq/g if the degree of grafting is less than 10%, and the swelling of the membrane in the presence of alcohol or water increases if the degree of grafting is more than 100%. In other words, the ion-exchange capacity increases if the degree of grafting is increased to introduce more ion-exchange groups. However, if an excessive amount of ion-exchange groups are introduced, the membrane will swell when incorporating water and its strength drops. Hence, the hybrid ion-exchange membrane of the present invention which comprises the functional inorganics and the graft polymer preferably has an ion-exchange capacity of 0.3 meq/g to 2.5 meq/g, more preferably 0.5 meq/g to 2.0 meq/g.

(On Electrical Conductivity)

Further speaking of the hybrid ion-exchange membrane comprising the functional inorganics and the graft polymer, the higher its electrical conductivity which is related to its ion-exchange capacity and percent water content, the smaller its electrical resistance and the higher its performance as an electrolyte membrane. If the electrical conductivity of the ion-exchange membrane at 25° C. is less than 0.05 $(\Omega \cdot cm)^{-1}$, the power performance as a fuel cell often drops significantly and, hence, the electrical conductivity of the ion-exchange membrane is often designed to be at least 0.05 $(\Omega \cdot cm)^{-1}$, and at least 0.10 $(\Omega \cdot cm)^{-1}$ in the case of an ion-exchange membrane with higher performance. The ion-exchange membrane of the present invention showed an electrical conductivity at 25° C. that was at least comparable to that of the Nafion® membrane. This was because the coexistence of the added functional inorganics and the sulfonic acid groups in the graft chains contributed to enhancing the conduction of protons.

In order to enhance the electrical conductivity of the ion-exchange membrane, one may try to reduce its thickness. However, given the current technology, an unduly thin ion-exchange membrane is easy to break, making it difficult to manufacture the functional inorganics/polymer membrane. Therefore, in the case of the present invention, an effective membrane thickness is between 30 and 200 μm, preferably between 30 and 150 μm.

(On Swelling)

Methanol is currently considered to be a candidate fuel for use in fuel cells but the perfluorosulfonic acid based Nafion® membrane, having no crosslinked structure between molecules, swells greatly in the presence of methanol and the "cross-over" of the fuel, or the diffusion of the fuel methanol from the anode (fuel electrode) to the cathode (air electrode) through the cell membrane, has been a big problem that is said to lower the efficiency of power generation. However, in the polymer ion-exchange membrane of the present invention, design features such as choosing hydrocarbon-based resins as the polymer, the presence of the functional inorganics and the introduction of a crosslinked structure contribute to substantially suppressing the swelling of the membrane in the presence of alcohols including methanol. Hence, the ion-exchange membrane of the present invention is useful as a membrane in a direct-methanol fuel cell which does not use a reformer but is fueled direct from methanol.

(On Durability)

In fuel cell membranes, the membrane oxidation resistance is an extremely important characteristic that is associated with the membrane durability (service life). During the cell operation, OH radicals and the like are generated and attack the ion-exchange membrane to cause its deterioration. A polymer ion-exchange membrane produced by first grafting styrene monomers to a polymer film and then sulfonating the polystyrene graft chains usually has low oxidation resistance. By contrast, the hybrid ion-exchange membrane according to the present invention which comprises the functional inorganics and the graft polymer is characterized in that the graft chains are produced by crosslinking of hydrocarbon-based monomers or are comprised of polymers or copolymers of fluorine-containing monomers, as well as in that such graft chains have reacted with the functional inorganics; as a result, the ion-exchange membrane of the present invention has high oxidation resistance. Comparing two cases of using the same kinds of styrene monomer and crosslinking agent, grafting of the monomer to a membrane having functional inorganics yields higher oxidation resistance with reference to the graft chains.

EXAMPLES

On the following pages, the present invention is described with reference to examples and comparative examples, to which the present invention is by no means limited. The various parameters referred to in those examples and comparative examples were measured by the following methods.

(1) Degree of Grafting

If that portion of the functional inorganics/polymer membrane to which a polymerizable monomer, a copolymerizable monomer and a crosslinking agent have been grafted is taken as the graft chain portion, the weight ratio of the graft chain portion to the membrane is expressed as the degree of grafting ($X_{dg}$ [wt %]) by the following equation:

$$X_{dg}=100(W_2-W_1)/W_1 \quad (1)$$

$W_1$: the weight (g) of the functional inorganics/polymer membrane $W_2$: the weight (g) of the functional inorganics/graft polymer membrane (dry state) after grafting (2) Ion-Exchange Capacity The ion-exchange capacity ($I_{ex}$ [meq/g]) of a membrane is expressed by the following equation:

$$I_{ex}=n(\text{acid group})_{obs}/W_d \quad (2)$$

n(acid group)$_{obs}$: the concentration of acid groups (mM/g) in the sulfonated ion-exchange membrane $W_d$: the dry weight (g) of the sulfonated ion-exchange membrane In order to ensure accuracy in the measurement of n(acid group)$_{obs}$, the membrane was immersed again in 1M (1 mole) sulfuric acid solution at 50° C. for 4 hours until it was completely converted to an acid form (H-form). Thereafter, the membrane was immersed in a 3M aqueous NaCl solution at 50° C. for 4 hours until it was converted to a —SO$_3$Na form; the replaced protons (H$^+$) were subjected to neutral titration with 0.2N NaOH to determine the concentration of acid groups.

(3) Percent Water Content

A H-form ion-exchange membrane stored in water at room temperature was taken out of the water, wiped lightly, and left to stand for a while (about 1 minute); the membrane's weight was found to be $W_s$ (g); thereafter, the membrane was vacuum-dried at 60° C. for 16 hours to measure its dry weight $W_d$ (g); the percent water content of the membrane can be determined from $W_s$ and $W_d$ by the following equation:

$$\text{Percent water content (\%)}=100\cdot(W_s-W_d)/W_d \quad (3)$$

(4) Electrical Conductivity

The electrical conductivity of the ion-exchange membrane was measured by the AC method [Shin-Jikken Kagaku Koza (New Course in Experimental Chemistry) 19, Kobunshi Kagaku (Polymer Science)<II>, p. 992, Maruzen] using a conventional membrane resistance measuring cell and an LCR meter E-4925A of Hewlett-Packard so as to measure the membrane resistance ($R_m$). The cell was filled with a 1M aqueous sulfuric acid solution and the resistance between platinum electrodes (5 mm apart) was measured both in the presence and absence of the membrane. The electrical conductivity (specific conductance) of the membrane was calculated by the following equation:

$$\kappa=1/R_m\cdot d/S((\Omega^1\,\text{cm}^{-1}) \quad (4)$$

$\kappa$=electrical conductivity ($\Omega^{-1}$ cm$^{-1}$) of the membrane d: the thickness (cm) of the ion-exchange membrane S: the area (cm$^2$) of the ion-exchange membrane through which an electric current was applied.

For comparison between measurements of electrical conductivity, the DC method was performed using a cell similar to that described by Mark W. Verbrugge, Robert F. Hill et al. (*J. Electrochem. Soc.*, 137, 3770-3777 (1990)) in combination with a potentiostat and a function generator. Good correlation was observed between the measurements of the AC and DC methods. The values in Table 1 (see below) were measurements by the AC method.

(5) Oxidation Resistance (Residual % by Weight)

The ion-exchange membrane was vacuum dried at 60° C. for 16 hours and its weight measured $W_3$; the dried membrane was stored in purified water for 24 hours and then treated with a 3% aqueous H$_2$O$_2$ solution at 80° C. for 24 hours; and the weight of the membrane as dried measured $W_4$.

$$\text{Oxidation resistance}=100(W_4/W_3) \quad (5)$$

Example 1

Fifty grams of pellets of a low-melting point ethylene-tetrafluoroethylene copolymer resin (hereinafter abbreviated as ETFE) as produced by Asahi Glass Company was put into LAB PLASTO-MILL (Model SOC150, a resin mixer equipped with agitating blades as produced by TOYO SEIKI Co., Ltd.) that had been heated up to 300° C.; in the mixer, the resin pellets were softened and kneaded. To the kneaded pellets, 2.5 g of amorphous silica (SiO$_2$: Aerosol, A380) was added in small amounts to make a uniform resin mixture. After cooling down the resin mixer, the resin mixture was recovered and fed into a hot press with 260° C., where it was shaped into a functional inorganics/ETFE membrane measuring 5 cm long, 5 cm wide and 50 μm thick.

The functional inorganics/ETFE membrane was cut to a size of 2 cm×2 cm and put into a separable glass container (3 cm i.d.×15 cm high) equipped with a cock; after degassing to less than 10$^{-3}$ Torr, the interior of the glass container was purged with argon gas. Under this condition, the functional inorganics/ETFE membrane was irradiated with γ-rays at room temperature to a total dose of 45 kGy (at a dose rate of 15 kGy/h). Subsequently, the glass container as it contained the functional inorganics/ETFE membrane was charged with a sufficient volume of a styrene monomer/toluene solution (having a styrene/toluene volume ratio of 1:1 and containing 4 mol % of divinylbenzene as a crosslinking agent with respect to the styrene) that it was immersed in the styrene monomer/toluene solution after preliminarily depriving the latter of oxygen by bubbling with argon gas. The contents of the glass container were agitated with a magnetic stirrer so that reaction took place at 60° C. for 48 hours to yield a functional inorganics/graft ETFE membrane. The graft ETFE membrane was washed first with toluene, then with acetone, and dried. The degree of grafting as determined by equation (1) was 57%. The thus obtained functional inorganics/graft ETFE membrane was immersed in a 0.5M chlorosulfonic acid solution (in the solvent 1,2-dichloroethane) to effect sulfonation reaction at 50° C. for 6 hours. Thereafter, the membrane was washed with water. The degree of grafting, ion-exchange capacity (equation (2)), percent water content (equation (3)), electrical conductivity (equation (4)), and oxidation resistance (equation (5)) of the membrane thus obtained in Example 1 are shown in Table 1 below.

Example 2

Fifty grams of pellets of a vinylidene fluoride resin (hereinafter abbreviated as PVdF) as produced by Kureha Corporation was put into LAB PLASTO-MILL (Model SOC150, a resin mixer equipped with agitating blades as produced by TOYO SEIKI Co., Ltd.) that had been heated up to 230° C.; in the mixer, the resin pellets were softened and kneaded. To the kneaded pellets, 2.5 g of a fine powder of phosphotungstic acid hydrate ($H_4PW_{12}O_{40}.36H_2O$) was added in small amounts to make a uniform resin mixture. After cooling down the resin mixer, the resin mixture was recovered and fed into a hot press with 200° C., where it was shaped into a functional inorganics/ETFE membrane measuring 5 cm long, 5 cm wide and 50 μm thick. The membrane was transferred into a SUS autoclaving irradiation vessel (7 cm i.d.×30 cm high), the interior of which was degassed to $10^{-3}$ Torr and purged with argon gas. Thereafter, the membrane was irradiated with $^{60}Co$-γ-rays at room temperature to a total dose of 300 kGy (at a dose rate of 5 kGy/h); subsequently, the vessel was heated to 120° C. to crosslink the membrane. To evaluate the degree of crosslinking, the degree of gelling of the membrane was measured in the solvent dimethylformamide; the result was 76%.

The functional inorganics/crosslinked PVdF membrane was cut to a size of 2 cm×2 cm and put into a separable glass container (3 cm i.d.×15 cm high) equipped with a cock; after degassing to less than $10^{-3}$ Torr, the interior of the glass container was purged with argon gas. Under this condition, the functional inorganics/crosslinked PVdF membrane was irradiated with γ-rays at room temperature to a total dose of 45 kGy (at a dose rate of 15 kGy/h). Subsequently, the glass container as it contained the functional inorganics/PVdF membrane was charged with a sufficient volume of a styrene monomer/toluene solution (having a styrene/toluene volume ratio of 1:1 and containing 4 mol % of divinylbenzene as a crosslinking agent with respect to the styrene) that it was immersed in the styrene monomer/toluene solution after preliminarily depriving the latter of oxygen by bubbling with argon gas. The contents of the glass container were agitated with a magnetic stirrer so that reaction took place at 60° C. for 48 hours to yield a functional inorganics/graft crosslinked PVdF membrane. The graft PVdF membrane was washed first with toluene, then with acetone, and dried. The degree of grafting as determined by equation (1) was 46%.

The thus obtained functional inorganics/graft crosslinked PVdF membrane was immersed in a 0.5M chlorosulfonic acid solution (in the solvent 1,2-dichloroethane) to effect sulfonation reaction at 50° C. for 6 hours. Thereafter, the membrane was washed with water. The degree of grafting, ion-exchange capacity (equation (2)), percent water content (equation (3)), electrical conductivity (equation (4)), and oxidation resistance (equation (5)) of the membrane thus obtained in Example 2 are shown in Table 1 below.

Example 3

Fifty grams of pellets of a polyether imide resin (hereinafter abbreviated as PEI) as produced by General Electric was put into LAB PLASTO-MILL (Model SOC150, a resin mixer equipped with agitating blades as produced by TOYO SEIKI Co., Ltd.) that had been heated up to 380-400° C.; in the mixer, the resin pellets were softened and kneaded. To the kneaded pellets, 2.5 g of amorphous silica ($SiO_2$: Aerosol, A380) was added in small amounts to make a uniform resin mixture. After cooling down the resin mixer, the resin mixture was recovered and fed into a hot press with 260° C., where it was shaped into a functional inorganics/PEI membrane measuring 5 cm long, 5 cm wide and 50 μm thick.

The functional inorganics/PEI membrane was cut to a size of 2 cm×2 cm and put into a separable glass container (3 cm i.d.×15 cm high) equipped with a cock; after degassing to less than $10^{-3}$ Torr, the interior of the glass container was purged with argon gas. Under this condition, the functional inorganics/PEI membrane was irradiated with γ-rays at room temperature to a total dose of 105 kGy (at a dose rate of 15 kGy/h). Subsequently, the glass container as it contained the functional inorganics/PEI membrane was charged with a sufficient volume of a styrene monomer/toluene solution (having a styrene/toluene volume ratio of 1:1 and containing 4 mol % of divinylbenzene as a crosslinking agent with respect to the styrene) that it was immersed in the styrene monomer/toluene solution after preliminarily depriving the latter of oxygen by bubbling with argon gas. The contents of the glass container were agitated with a magnetic stirrer so that reaction took place at 60° C. for 72 hours to yield a functional inorganics/graft PEI membrane. The graft PEI membrane was washed with acetone and dried. The degree of grafting as determined by equation (1) was 62%. The thus obtained functional inorganics/graft PEI membrane was immersed in a 0.5M chlorosulfonic acid solution (in the solvent 1,2-dichloroethane) to effect sulfonation reaction at 50° C. for 6 hours. Thereafter, the membrane was washed with water. The degree of grafting, ion-exchange capacity (equation (2)), percent water content (equation (3)), electrical conductivity (equation (4)), and oxidation resistance (equation (5)) of the membrane thus obtained in Example 3 are shown in Table 1 below.

Example 4

Fifty grams of pellets of a polyether imide resin (hereinafter abbreviated as PEI) as produced by General Electric was put into LAB PLASTO-MILL (Model SOC150, a resin mixer equipped with agitating blades as produced by TOYO SEIKI Co., Ltd.) that had been heated up to 380-400° C.; in the mixer, the resin pellets were softened and kneaded. To the kneaded pellets, 2.5 g of amorphous silica (SiO$_2$: Aerosol, A380) was added in small amounts to make a uniform resin mixture. After cooling down the resin mixer, the resin mixture was recovered and fed into a hot press with 360° C., where it was shaped into a functional inorganics/PEI membrane measuring 5 cm long, 5 cm wide and 50 μm thick.

The functional inorganics/PEI membrane was cut to a size of 2 cm×2 cm and put into a separable glass container (3 cm i.d.×15 cm high) equipped with a cock; the glass container was subsequently charged with a sufficient volume of a solution of the polymerizable monomer 1,2,2-trifluoroethylene sulfonyl fluoride (CF$_2$=CF(SO$_2$F)) that it was immersed in the monomer solution. Under this condition, freeze degassing was effected three times to remove oxygen out the monomer solution and from within the container. Thereafter, argon gas was introduced into the container. The functional inorganics/PEI membrane as it was immersed in the monomer solution was subjected to simultaneous irradiation with γ-rays at room temperature for 20 hours to a total dose of 300 kGy (at a dose rate of 15 kGy/h). After the irradiation, the contents of the glass container were agitated with a magnetic stirrer so that reaction took place at 50° C. for 24 hours to yield a functional inorganics/graft PEI membrane. The functional inorganics/graft PEI membrane was washed with acetone and dried. The degree of grafting as determined by equation (1) was 23%. The thus obtained graft PEI membrane was subjected to reaction at 80° C. for 24 hours in a 20 wt % KOH solution in dimethyl sulfoxide/water (1:2). After the reaction, the membrane was washed with water and treated in a 2N sulfuric acid solution at 60° C. for 4 hours. The degree of grafting, ion-exchange capacity (equation (2)), percent water content (equation (3)), electrical conductivity (equation (4)), and oxidation resistance (equation (5)) of the membrane thus obtained in Example 4 are shown in Table 1 below.

Example 5

Fifty grams of pellets of a polyether imide resin (hereinafter abbreviated as PEI) as produced by General Electric was put into LAB PLASTO-MILL (Model SOC150, a resin mixer equipped with agitating blades as produced by TOYO SEIKI Co., Ltd.) that had been heated up to 380-400° C.; in the mixer, the resin pellets were softened and kneaded. To the kneaded pellets, 2.5 g of a fine powder of phosphotungstic acid hydrate (H$_4$PW$_{12}$O$_{40}$.36H$_2$O) was added in small amounts to make a uniform resin mixture. After cooling down the resin mixer, the resin mixture was recovered and fed into a hot press with 360° C., where it was shaped into a functional inorganics/PEI membrane measuring 5 cm long, 5 cm wide and 50 μm thick.

The functional inorganics/PEI membrane was cut to a size of 2 cm×2 cm and put into a separable glass container (3 cm i.d.×15 cm high) equipped with a cock; the glass container was subsequently charged with a sufficient volume of a monomer/comonomer solution comprising a mixture of 1,2,2-trifluoroethylene sulfonyl fluoride (CF$_2$=CF(SO$_2$F)) and methyl-1,2,2-trifluoroacrylate (CF$_2$=CFCOOCH$_3$) at a volume ratio of 3:2 that it was immersed in the monomer/comonomer solution. Under this condition, freeze degassing was effected three times to remove oxygen out the monomer/comonomer solution. Thereafter, argon gas was introduced into the container. The functional inorganics/PEI membrane as it was immersed in the monomer/comonomer solution was subjected to simultaneous irradiation with γ-rays at room temperature for 16 hours to a total dose of 240 kGy (at a dose rate of 15 kGy/h). After the irradiation, the contents of the glass container were agitated with a magnetic stirrer so that reaction took place at 50° C. for 48 hours to yield a functional inorganics/graft PEI membrane. This graft polymer membrane was washed with acetone and dried. The degree of grafting as determined by equation (1) was 37%.

The thus obtained functional inorganics/graft PEI membrane was subjected to reaction at 80° C. for 24 hours in a 20 wt % KOH solution in dimethyl sulfoxide/water (1:2). After the reaction, the membrane was recovered, washed with water and treated in a 2N sulfuric acid solution at 60° C. for 4 hours. The degree of grafting, ion-exchange capacity (equation (2)), percent water content (equation (3)), electrical conductivity (equation (4)), and oxidation resistance (equation (5)) of the membrane thus obtained in Example 5 are shown in Table 1 below.

Comparative Examples 1 and 2

Nafion 115 and Nafion 117 as shown in Table 1 below (both being produced by DuPont) were measured for ion-exchange capacity, percent water content and electrical conductivity; the results are also shown in Table 1 for "Comparative Example 1" and "Comparative Example 2."

Comparative Example 3

Fifty grams of pellets of a polyether imide resin (hereinafter abbreviated as PEI) as produced by General Electric was put into LAB PLASTO-MILL (Model SOC150, a resin mixer equipped with agitating blades as produced by TOYO SEIKI Co., Ltd.) that had been heated up to 380-400° C.; in the mixer, the resin pellets were softened and kneaded. The resin mixture was recovered and fed into a hot press with 360° C., where it was shaped into a PEI membrane measuring 5 cm long, 5 cm wide and 50 μm thick. The PEI membrane was put into a separable glass container (3 cm i.d.×15 cm high) equipped with a cock; after degassing, the interior of the glass container was purged with argon gas. Under this condition, the PEI membrane was irradiated with γ-rays at room temperature to a total dose of 105 kGy (at a dose rate of 15 kGy/h). Subsequently, the glass container as it contained the PEI membrane was charged with a sufficient volume of a styrene monomer/toluene solution (having a styrene/toluene volume ratio of 1:1 and containing 4 mol % of divinylbenzene as a crosslinking agent with respect to the styrene) that it was immersed in the styrene monomer/toluene solution after preliminarily depriving the latter of oxygen by bubbling with argon gas. The contents of the glass container were agitated so that reaction took place at 60° C. for 72 hours. The graft copolymerized membrane was washed first with toluene, then with acetone and dried. The degree of grafting as determined by equation (1) was 24%. This graft polymerized membrane was immersed in a 0.5M chlorosulfonic acid solution (in the solvent 1,2-dichloroethane) to effect sulfonation reaction at 50° C. for 6 hours. Thereafter, the membrane was washed with water to effect conversion to sulfonic acid groups. The degree of grafting, ion-exchange capacity (equation (2)), percent water content (equation (3)), electrical conductivity (equation (4)), and oxidation resistance (equation (5)) of the membrane thus obtained in Comparative Example 3 are also shown in Table 1 below.

TABLE 1

Characteristics of Hybrid Ion-Exchange Membrane Comprising Functional Inorganics and Graft Polymer

| | Degree of grafting (%) | Ion-exchange capacity (meq/g) | Electrical conductivity ($\Omega \cdot cm^{-1}$) | Water content (%) | Oxidation resistance |
|---|---|---|---|---|---|
| Example 1 | 57 | 1.2 | 0.13 | 32 | 72 |
| Example 2 | 46 | 1.1 | 0.12 | 30 | 78 |
| Example 3 | 62 | 1.2 | 0.13 | 33 | 68 |
| Example 4 | 23 | 0.6 | 0.08 | 24 | 98 |
| Example 5 | 37 | 0.8 | 0.09 | 27 | 97 |
| Comparative Example 1 Nafion 115[a] | — | (0.91) | (0.059) | (34) | 100 |
| Comparative Example 2 Nafion 117[b] | — | 0.90 (0.91) | 0.05 (0.055) | 19 (31) | 100 |
| Comparative Example 3 | 24 | 0.8 | 0.07 | 20 | 56 |

[a] Electrochimica Acta, 40, (3), 335-344 (1995)
[b] J. Electrochem. Soc., 145, 107-110 (1998)

The values in parentheses were obtained under the same conditions of measurement as in the Examples.

What is claimed is:

1. A process for producing a hybrid ion-exchange membrane comprising functional inorganics and a graft polymer, the process comprising:
    adding at least one inorganic fine powder selected from the group consisting of fine particulate amorphous silica ($SiO_2$), $H^+$ form mordenite (($Ca$, $Na_2$, $K_2$)$Al_2Si_{10}O_{24} \cdot 7H_2O$), alumina ($Al_2O_3$), and zirconium oxide ($ZrO_2$) to an ethylene-tetrafluoroethylene copolymer as a thermoplastic polymer in an amount ranging from 1 wt % to 20 wt % of the polymer,
    mixing the ingredients uniformly,
    shaping the mixture to form a functional inorganics/polymer membrane,
    exposing the functional inorganics/polymer membrane to an ionizing radiation for a total dose ranging from 10 kGy to 1 MGy, then
    bringing the membrane into contact with the oxygen-free polymerizable monomer styrene so that the styrene is grafted to the functional inorganics/polymer membrane to prepare a functional inorganics/graft polymer membrane, and
    reacting the functional inorganics/graft polymer membrane with chlorosulfonic acid to introduce sulfonic acid groups into the phenyl groups in the graft chains.

2. The process for producing a hybrid ion-exchange membrane comprising functional inorganics and a graft polymer according to claim 1, wherein a tetrafluoroethylene-hexafluoropropylene copolymer, a tetrafluoroethylene-perfluoroalkylvinyl ether copolymer, or poly(vinylidene fluoride) is used as the thermoplastic polymer.

3. The process for producing a hybrid ion-exchange membrane comprising functional inorganics and a graft polymer according to claim 1, wherein a high-molecular weight polyethylene, polypropylene or polyamide is used as the thermoplastic polymer.

4. The process for producing a hybrid ion-exchange membrane comprising functional inorganics and a graft polymer according to claim 1, wherein polyethylene terephthalate, polyamide, polyimide, polyether imide, polyamideimide, or polybenzimidazole which have aromatic rings is used as the thermoplastic polymer.

5. The process for producing a hybrid ion-exchange membrane comprising functional inorganics and a graft polymer according to claim 1, 2, 3, or 4, wherein at least one monomer selected from the group consisting of styrene derived monomers, i.e., α-methylstyrene, 2,4-dimethylstyrene, vinyltoluene, and 4-tert-butylstyrene, polymerizable monomers having aromatic rings, i.e., acenaphthylene, indene, benzofuran, 5-vinyl-2-norbornane, and vinyl ketone $CH_2=CH(CO(-C_6H_5))$, and vinyl ether fluorides, i.e., $CF_2=CF(O(-C_6H_5))$ and $CH_2=CF(O(-C_6H_5))$ is used as the polymerizable monomer.

6. The process for producing a hybrid ion-exchange membrane comprising functional inorganics and a graft polymer according to claim 1, 2, 3, or 4, wherein at least one monomer selected from the group consisting of monomers having a sulfonyl halide group, i.e., $CF_2=CF(SO_2X^1)$ (where $X^1$ is the halogen group —F or —Cl, as hereinafter) and $CH_2=CF(SO_2X^1)$ is used as the polymerizable monomer to prepare a functional inorganics/graft polymer membrane, an alkali solution rather than the chlorosulfonic acid is acted upon the graft polymer membrane so that [—$SO_2X^1$] groups in the graft molecular chains are converted to sulfonate group [—$SO_3M$] (where M is the alkali metal Na or K) which is then converted to sulfonic acid group [—$SO_3H$].

7. The process for producing a hybrid ion-exchange membrane comprising functional inorganics and a graft polymer according to claim 1, 2, 3 or 4, wherein at least one monomer selected from the group consisting of monomers having a sulfonyl halide group, i.e., $CF_2=CF(O(CF_2)_{1-2}SO_2X^1)$ (where $X^1$ is the halogen group —F or —Cl, as hereinafter) and $CF_2=CF(OCH_2(CF_2)_{1-2}SO_2X^1)$ is used as the polymerizable monomer to prepare a functional inorganics/graft polymer membrane, an alkali solution rather than the chlorosulfonic acid is acted upon the graft polymer membrane so that [—$SO_2X^1$] groups in the graft molecular chains are converted to sulfonate group [—$SO_3M$] (where M is the alkali metal Na or K) which is then converted to sulfonic acid group [—$SO_3H$].

8. The process for producing a hybrid ion-exchange membrane comprising functional inorganics and a graft polymer according to claim 1, 2, 3 or 4, wherein at least one monomer selected from the group consisting of monomers having an active halogen group, i.e., $CF_2=CF(O(CF_2)_{1-2}X^2)$ (where $X^2$ is the halogen group —Br or —Cl, as hereinafter), $CF_2=CF(OCH_2(CF_2)_{1-2}X^2)$ and $CF_2=CFBr$ is used as the polymerizable monomer to prepare a functional inorganics/graft polymer membrane, the active halogen group [—$X^2$, Br] in the grafted molecular chains in the graft polymer membrane is subjected to reaction in a solution of sulfite or hydrogensulfite in water or a mixture of water and alcohol rather than the chlorosulfonic acid so that it is converted to sulfonate group [—$SO_3M$] (where M is the alkali metal Na or K) which is then converted to sulfonic acid group [—$SO_3H$].

9. The process for producing a hybrid ion-exchange membrane comprising functional inorganics and a graft polymer according to claim 1, 2, 3, or 4, wherein the functional inorganics/graft polymer membrane is prepared using a polymerizable monomer/copolymerizable monomer system comprising one or more of the polymerizable monomers and at least one copolymerizable monomer selected from the group consisting of acrylic monomers, i.e., $CF_2=CR^1(COOR^2)$ (where $R^1$ is —$CH_3$ or —F, and $R^2$ is —H, —$CH_3$, —$C_2H_5$ or —$C(CH_3)_3$, as hereinafter) and $CH_2=CR^1(COOR^2)$, and ethylenic monomers, i.e., $CH_2=CF_2$ and $CH_2=C(CH_3)_2$, said copolymerizable monomer being added in an amount not exceeding 100 mol % of the polymerizable monomer.

10. The process for producing a hybrid ion-exchange membrane comprising functional inorganics and a graft polymer according to claim 1, 2, 3, or 4, wherein one or more of the polymerizable monomers and polymerizable monomer/copolymerizable monomer system is used in combination with at least one crosslinking agent selected from the group consisting of divinylbenzene, triallyl cyanurate, triallyl isocyanurate, 3,5-bis(trifluorovinyl)phenol, and 3,5-bis(trifluorovinyloxy)phenol, as well as $CH_2=CH-C_6H_4-(CH_2)_n-C_6H_4-CH=CH_2$ wherein n=1-4 and $CH_2=CH-C_6H_4-C(C_6H_5)_2-C_6H_4-CH=CH$, having a bis(vinylphenyl) group, the crosslinking agent being added in an amount not exceeding 30 mol % of the total monomers (the sum of the polymerizable monomers and the copolymerizable monomers), the resulting total monomers/crosslinking agent system being used to prepare the functional inorganics/graft polymer membrane.

11. The process for producing a hybrid ion-exchange membrane comprising functional inorganics and a graft polymer according to claim 1, wherein a crosslinked structure is introduced into either the functional inorganics/polymer membrane prepared by shaping the mixture of the inorganic fine powder and the thermoplastic polymer or the functional inorganics/graft polymer membrane prepared by contacting the functional inorganics/polymer membrane with the polymerizable monomer.

12. The process for producing a hybrid ion-exchange membrane comprising functional inorganics and a graft polymer according to claim 1, wherein graft polymerization is performed by a simultaneous graft polymerization method in which the functional inorganics/polymer membrane is irradiated simultaneously with the polymerizable monomer, the copolymerizable monomer and the crosslinking agent.

13. An electrolyte membrane for use in fuel cells comprising the hybrid ion-exchange membrane which comprises functional inorganics and a graft polymer and is produced by the process according to claim 1, the membrane having a degree of grafting at 10-100% and an ion-exchange capacity of 0.3-2.5 meq/g.

* * * * *

UNITED STATES PATENT AND TRADEMARK OFFICE
CERTIFICATE OF CORRECTION

PATENT NO.       : 7,785,726 B2  
APPLICATION NO.  : 11/397808  
DATED            : August 31, 2010  
INVENTOR(S)      : Masaru Yoshida et al.

Page 1 of 1

It is certified that error appears in the above-identified patent and that said Letters Patent is hereby corrected as shown below:

Column 19, Line 11, change "=CH," to --=CH$_2$--.

Signed and Sealed this  
Fifth Day of April, 2011

David J. Kappos  
*Director of the United States Patent and Trademark Office*